United States Patent [19]

Takaku

[11] Patent Number: 5,005,464
[45] Date of Patent: Apr. 9, 1991

[54] BRAKE BOOSTER
[75] Inventor: Hitoshi Takaku, Saitama, Japan
[73] Assignee: Jidosha Kiki Co., Ltd., Tokyo, Japan
[21] Appl. No.: 327,342
[22] Filed: Mar. 22, 1989
[30] Foreign Application Priority Data Apr. 11, 1988 [JP] Japan .................................. 63-88850

[51] Int. Cl.⁵ ............................................. F01B 25/02
[52] U.S. Cl. ........................................ 91/6; 91/369.1;
91/369.2; 91/376 R
[58] Field of Search ......................... 91/6, 360, 376 R;
60/547.1

[56] References Cited
U.S. PATENT DOCUMENTS 3,127,966  4/1964  Sheriff et al. ........................ 60/547.1
4,759,255  7/1988  Shimamura ........................ 60/547.1

Primary Examiner—Edward K. Look
Assistant Examiner—F. Daniel Lopez
Attorney, Agent, or Firm—Flynn, Thiel, Boutell & Tanis

[57] ABSTRACT

An open/close valve which opens or closes a passage providing a communication between a valve mechanism and a constant pressure chamber of a brake booster is disclosed. The valve comprises a valve seat formed in surrounding relationship with a passage, a valve element disposed within a casing which is mounted on the valve body so as to be reciprocably movable therein, and a pressure chamber defined within the casing for urging the valve element toward the valve seat. Pressure fluid supply means supplies a pressure fluid into the pressure chamber from the outside of a shell to cause the valve element to be seated upon the valve seat. As compared with the solenoid-operated valve, an axial size of the open/close valve can be reduced while avoiding any heating effect.

11 Claims, 2 Drawing Sheets

BRAKE BOOSTER

FIELD OF THE INVENTION

The invention relates to a brake booster, and more particularly, to a brake booster including an open/close valve which opens or closes a passage providing a communication between a valve mechanism and a constant pressure chamber.

DESCRIPTION OF THE PRIOR ART

A brake booster is known in the art including a power piston which is slidably disposed within a shell, a valve mechanism received within a valve body which is located in an axial portion of the power piston, a constant pressure chamber and a variable pressure chamber which are formed forwardly and rearwardly of the power piston as viewed in the direction in which it is operated, a passage formed in the valve body for providing a communication between the valve mechanism and the constant pressure chamber, and a solenoid operated open/close valve mounted on the valve body for opening and closing the passage, the arrangement being such that the solenoid operated valve is closed to provide a continued braking action even after the depression of a brake pedal is terminated whenever a given condition is satisfied such as a continued depression of the brake pedal for a given time interval while a vehicle remains at rest (see Japanese Laid-Open Patent Application No. 279,164/1987).

However, when the solenoid operated valve is mounted on the valve body, it becomes necessary to increase an axial size of the brake booster in order to avoid an interference of the solenoid valve with the internal wall of the shell. It is desirable that the axial size of the solenoid valve be reduced in order to suppress an increase in the axial size of the brake booster.

While an axial size of a solenoid coil is effective in achieving a reduction in the axial size of the solenoid valve, there is a certain limit upon reducing the axial size inasmuch as a reduction in the number of turns of the coil results in a reduced force of attraction exerted by the solenoid coil. On the other hand, if the magnitude of the current flow through the coil is increased in order to compensate for a reduced number of turns of the coil, there results an increased heating effect, adversely influencing upon the durability of a diaphragm or the valve body.

SUMMARY OF THE INVENTION

In view of the foregoing, in accordance with the invention, an open/close valve as used in a brake booster constructed in a manner as mentioned above comprises a valve seat which is formed in surrounding relationship with the passage, a valve element reciprocably movable within a casing which is mounted on the valve body, a pressure chamber defined within the casing for urging the valve element toward the valve seat, and pressure fluid supply means for supplying a pressure fluid into the pressure chamber to cause the valve element to be seated upon the valve seat.

With this arrangement, the force with which the valve element is urged can be increased depending on the magnitude of the pressure fluid which is supplied to the pressure chamber, thus allowing an axial size of the valve to be reduced as compared with the conventional solenoid operated open/close valve, while avoiding any heat source as experienced in the prior art to thereby eliminate adverse influences of heat upon a diaphragm or a valve body in a perfect manner.

Above and other objects, features and advantages of the invention will become apparent from the following description of several embodiments thereof with reference to the attached drawings.

DETAILED DESCRIPTION OF EMBODIMENTS

Figure 1:
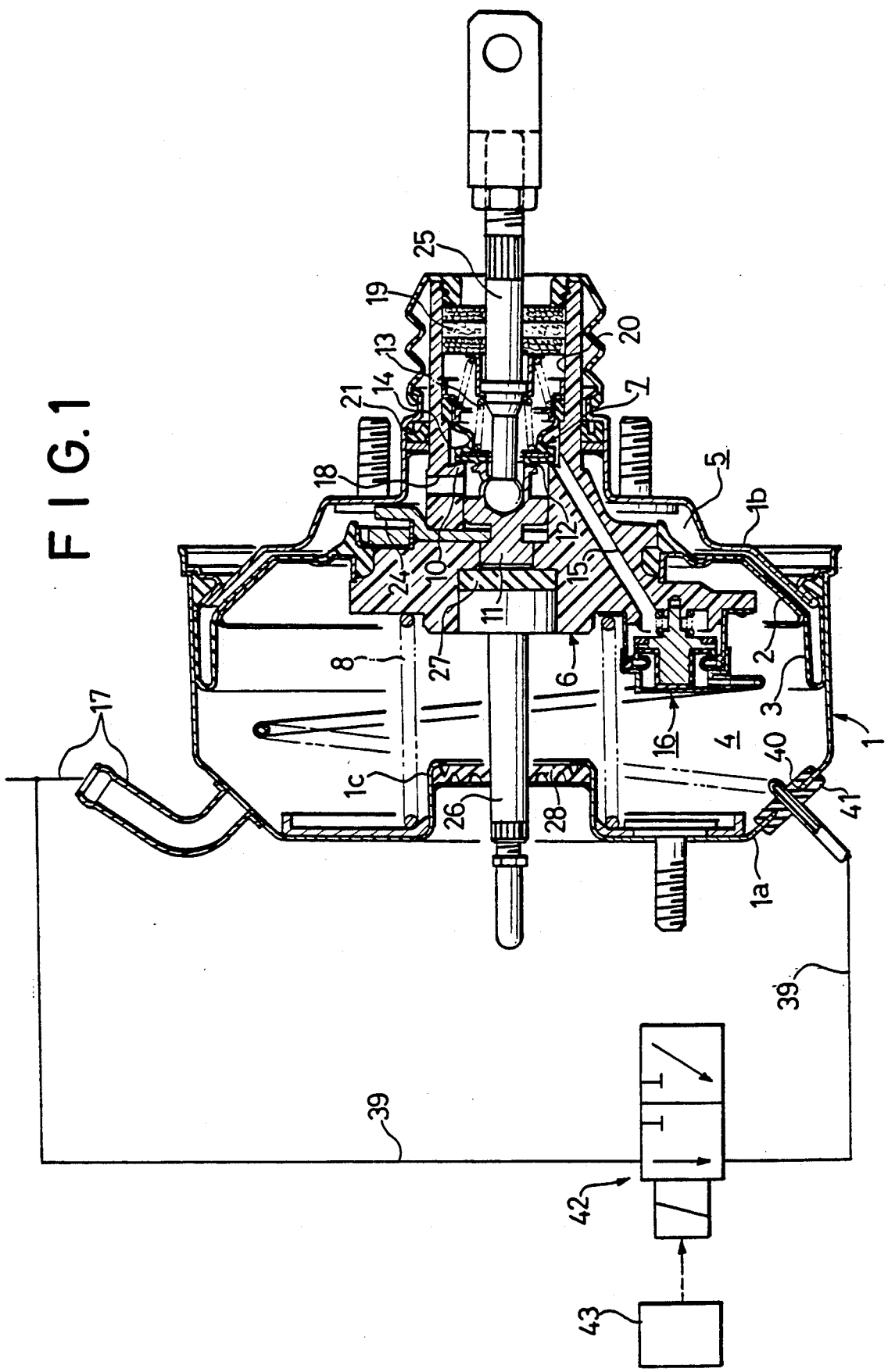
FIG. 1 is a cross section, partly in side elevation, of one embodiment of the invention.

Referring to the drawings, several embodiments of the invention will now be described. Initially referring to FIG. 1, a brake booster includes a shell 1 formed by a front shell 1a and a rear shell 1b. A power piston 2 is slidably disposed within the shell 1, and a diaphragm 3 is applied to the back surface of the power piston 2 so that the combination of the power piston and the diaphragm is effective to divide the interior of the shell 1 into a forwardly located, constant pressure chamber 4 and a rearwardly located, variable pressure chamber 5.

An axial portion of the power piston 2 is integrally formed with a valve body 6 which receives a valve mechanism 7 for switching a fluid circuit. The power piston and the valve body 6 are normally maintained in their inoperative positions, shown, by a return spring 8.

The valve mechanism 7 comprises a first valve seat 10 formed on the valve body 6, a second valve seat 12 formed on a valve plunger 11, and a valve element 14 which is adapted to be seated upon either valve seat 10 or 12 from the rear side of the power piston 2 or from the right side, as viewed in FIG. 1, under the resilience of a spring 13.

A space disposed externally of a seal defined between the first seat 10 and the valve element 14 communicates with the constant pressure chamber 4 through a passage 15 and an open/close valve 16, and the chamber 4 communicates with a source of negative pressure such as an intake manifold of an associated engine, not shown, through a tubing 17 mounted on the shell 1 for introducing a negative pressure.

On the other hand, an intermediate space between the first valve seat 10 against the valve element 14 and the second valve seat 12 against the valve element 14 communicates with the variable pressure chamber 5 through a passage 18 formed in the valve body 6. Finally, a space disposed internally of the second valve seat 12 against the valve element 14 communicates with the atmosphere through a passage 20 in which a filter 19 is disposed. The variable pressure chamber 5 is hermetically sealed against the exterior by a seal member 21 which slidably extends through the valve body 6.

The valve plunger 11, which forms the valve mechanism 7, is locked against withdrawal from the valve body 6 by a key member 24, and has its end connected to an input shaft 25 which is mechanically coupled to a brake pedal, not shown. The other end face of the valve plunger 11 is disposed in opposing relationship with an end face of a push rod 26, with a reaction disc 27 interposed between the opposing surfaces. The front shell 1a includes an axial portion which is formed with a reentrant cylindrical portion 1c which projects into the shell 1, with a seal member 28 disposed therein. The push rod 26 slidably extends through the seal member 28 to the exterior of the shell 1 for connection with the piston of a master cylinder, not shown.

The open/close valve 16 is disposed within the constant pressure chamber 4 and is mounted on the valve body 6 at a position which is outside and below the coiled return spring 8, thus allowing the passage 15 formed in the valve body 6 to be opened or closed by the valve 16.

Figure 2:
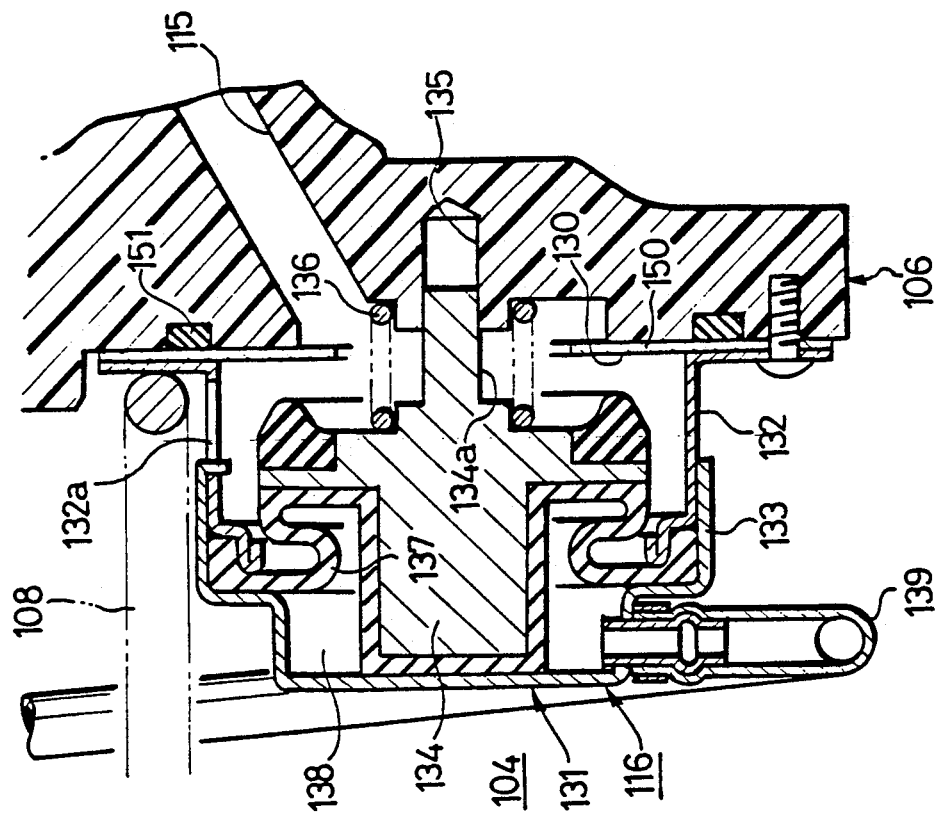
FIG. 2 is a cross section, to an enlarged scale, of part of FIG. 1.

As shown to an enlarged scale in FIG. 2, the valve 16 includes a casing 31 which is positioned to cover a valve seat 30 formed in surrounding relationship with the opening of the passage 15 into the constant pressure chamber 4. The casing 31 comprises a cylindrical member 32 secured to the valve body 6 in surrounding relationship with the valve seat 30, and a cup-shaped member 33 integrally fastened to the free end of the cylindrical member 32 around its outer periphery.

A valve element 34 which is adapted to be seated upon the valve seat 30 is received within the casing 31, and includes a reduced diameter portion 34a at its right end, which slidably fits in a guide opening 35 formed in the valve body 6, whereby the valve element 34 is reciprocably movable in the axial direction of the casing 31. A spring 36 is disposed between the valve element 34 and the valve body 6 for normally maintaining the valve element 34 spaced from the valve seat 30.

A diaphragm 37 is applied to the left end face of the valve element 34 and includes a bead around its periphery which is held sandwiched between abutting portions of the members 32 and 33 in a hermetically sealed manner, thus defining a pressure chamber 38 between the diaphragm 37 and the cup-shaped member 33. On the other hand, a space located on the opposite side of the diaphragm 37 from the pressure chamber 38 communicates with the constant pressure chamber 4 through an opening 32a formed in the cylindrical member 32.

A flexible conduit 39 has its one end connected to a selected position around the periphery of the cup-shaped member 33 which defines the pressure chamber 38 and has its other end taken out of the shell 1 through a grommet 41 disposed in an opening 40 formed in the front shell 1a after it is helically wound within the constant pressure chamber 4 of the shell 1 for communication with a source of negative pressure such as an intake manifold, as mentioned above, through a solenoid-operated channel switching valve 42.

The switching valve 42 is controlled by a controller 43 including a microcomputer, and is normally maintained in its inoperative position in which it communicates with the source of negative pressure, thus introducing a negative pressure into the pressure chamber 38. However, when the controller 43 switches a channel, an atmospheric pressure is introduced into the pressure chamber 38 to cause the valve element 34 to be seated upon the valve seat 30 against the resilience of the spring 36, thus closing the valve 16.

In the present embodiment, the conduit 39, the switching valve 42 and the controller 43 form together pressure fluid supply means which supplies a pressure fluid into the pressure chamber 38 from the outside of the shell 1.

In the described arrangement, under a normal condition, the controller 43 maintains the valve 42 in communication with a source of negative pressure, thus introducing a negative pressure into the pressure chamber 38 of the valve 16. Accordingly, the valve element 34 is held spaced from the valve seat 30 by the spring 36, thus maintaining the passage 15 open.

When the passage 15 is open, the brake booster operates in the similar manner as a conventional brake booster which is not provided with the valve 16, and hence is capable of producing a braking action in response to the depression of a brake pedal, generally in the similar manner as in the prior art.

When a given condition is satisfied, for example, when it is detected that a brake pedal has been depressed continuously over a given time interval while a vehicle remains at rest, the controller 43 switches the valve 42 for connection with the atmosphere. Thereupon, the atmosphere is introduced into the pressure chamber 38 of the valve 16 through the conduit 39, whereby the valve element 34 becomes seated upon the valve seat 30 against the resilience of the spring 36 to close the passage 15.

Under this condition, if the brake pedal is released to switch the channel defined by the valve mechanism 7, the atmosphere which has been introduced into the variable pressure chamber 5 cannot find its way into the constant pressure chamber 4, thus maintaining the braking action which prevailed before releasing the brake pedal. By choosing a suitable resilience for the spring 36, the open/close valve may also serve as a relief valve, thus preventing an excessively high pressure from being confined within the variable pressure chamber 5.

If an accelerator pedal is now depressed, the controller 43 switches the valve 42 for communication with the source of negative pressure to introduce a negative pressure into the pressure chamber 38, whereby the valve element 34 moves away from the valve seat 30 under the resilience of the spring 36, thus allowing the atmosphere which has been introduced into the variable pressure chamber 5 to find its way into the constant pressure chamber 4 to return the brake booster to its inoperative condition.

In the present embodiment, the magnitude of the force with which the valve element 34 is urged can be increased depending on the pressure fluid which is supplied to the pressure chamber 38, facilitating an axial size thereof to be reduced in comparison to a solenoid-operated open/close valve as used in the prior art. In addition, a heating effect caused by the solenoid coil can be avoided, thus perfectly eliminating any adverse influence of heat upon the valve body 6 or the power piston 2.

In a conventional arrangement in which a harness connected to the solenoid-operated valve is taken out of the shell in a hermetically sealed manner, a hermetic seal between a coating and a core wire of the harness cannot be maintained even though a hermetic seal between the coating and the shell may be maintained, thus giving rise to the likelihood that a leakage may occur through a clearance therebetween. However, such likelihood is eliminated in the present embodiment.

It is to be noted that the pressure chamber 38 has a reduced volume, allowing the thickness of the conduit 39 to be reduced. The use of a thin conduit 39 will not cause any significant influence upon the pressure within the constant pressure chamber 4 if the connection between the conduit 39 and the casing 31 should be broken, thus assuring a normal operation of the brake booster. It should also be noted that an orifice may be alternatively provided rather than reducing the thickness of the conduit 39.

Figure 3:
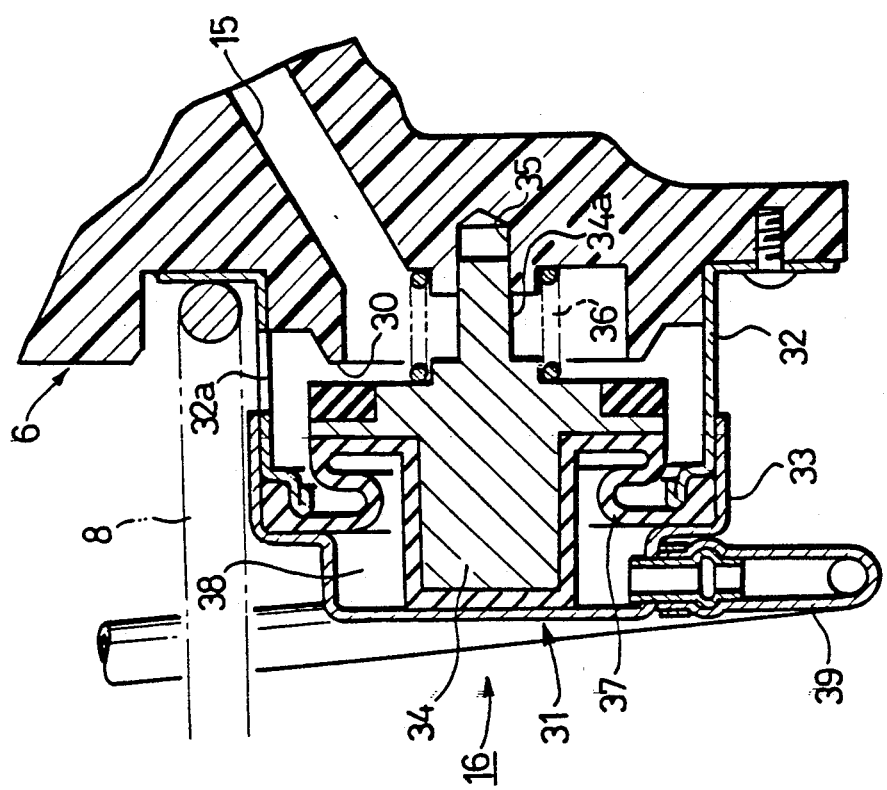
FIG. 3 is a cross section, to an enlarged scale, of an essential part of another embodiment of the invention.

FIG. 3 shows another embodiment of the invention in which an opening of a passage 115, formed in a valve body 106, into a constant pressure chamber 104 is covered by a plate 150 having a center opening, the edge of which defines a valve seat 130 which surrounds the opening of the passage 115. A hermetic seal is maintained between the plate 150 and the valve body 106 by a seal member 151 which surrounds the passage 115.

In other respects, the arrangement is essentially the same as described in connection with the first mentioned embodiment, and corresponding parts to those of the first embodiment are designated by reference numerals thereof, to which 100 is added. It will be apparent that this embodiment again achieves the similar functioning as that achieved by the first mentioned embodiment.

While the invention has been disclosed above in connection with several embodiments thereof, it should be understood that a number of changes, modifications and substitutions will readily occur to one skilled in the art without departing from the spirit and scope of the invention defined by the appended claims.

What is claimed is:

1. A brake booster including a power piston slidably disposed within a shell, a valve mechanism received in a valve body which is arranged in an axial portion of the power piston, a constant pressure chamber and a variable pressure chamber defined forwardly and rearwardly, respectively, of the power piston as viewed in the direction of operation thereof, a passage formed in the valve body for providing a communication between the valve mechanism and the constant pressure chamber, and an open/close valve mounted on the valve body for opening and closing the passage;

characterized in that the open/close valve comprises a valve seat formed in surrounding relationship with the passage, a valve element reciprocally movable within a casing which is mounted on the valve body, the casing comprising a cylindrical member secured to the valve body in surrounding relationship with the valve seat, the cylindrical member being formed with an opening which provides a communication between the interior and the exterior thereof, and a cup-shaped member integrally fastened to the cylindrical member, a diaphragm applied across the inner periphery of the casing and the valve element and having an outer peripheral portion which is held between the cylindrical member and the cup-shaped member to define a pressure chamber within the cup-shaped member for urging the valve element toward the valve seat, and pressure fluid supply means for supplying a pressure fluid into the pressure chamber from the outside of the shell to cause the valve element to be seated upon the valve seat.

2. A brake booster according to claim 1 in which a plate is mounted on the end of the valve body in surrounding relationship with the opening of the passage and in a hermetically sealed manner, the valve seat being defined on the plate.

3. A brake booster according to claim 1 in which the valve element is formed with a reduced diameter portion which projects toward the valve body, the reduced diameter portion being slidably fitted into a guide opening formed in the valve body.

4. A brake booster according to claim 1 in which the pressure fluid supply means comprises a conduit which provides a communication between the pressure chamber and a source of pressure fluid which is disposed externally of the shell, a channel switching valve disposed intermediate the conduit for selectively switching the pressure chamber to the source of pressure fluid or the atmosphere, and a controller for controlling the switching valve.

5. A brake booster including a power piston slidably disposed within a shell, a valve mechanism received in a valve body which is arranged in an axial portion of the power piston, a constant pressure chamber and a variable pressure chamber defined forwardly and rearwardly, respectively, of the power piston as viewed in the direction of operation thereof, a passage formed in the valve body for providing a communication between the valve mechanism and the constant pressure chamber, and an open/close valve mounted on the valve body for opening and closing the passage;

characterized in that the open/close valve comprises a valve seat formed in surrounding relationship with the passage, a valve element reciprocally movable within a casing which is mounted on the valve body, a pressure chamber defined in the casing for urging the valve element toward the valve seat, and pressure fluid supply means for supplying a pressure fluid into the pressure chamber from the outside of the shell to cause the valve element to be seated upon the valve seat, the valve element also serving as a relief valve which is urged to move away from the valve seat in response to a fluid pressure introduced into the variable pressure chamber when the valve element is seated upon the valve seat and which moves away from the valve seat when a fluid pressure in excess of a given value is introduced into the variable pressure chamber.

6. A brake booster including a power piston slidably disposed within a shell, a valve mechanism received in a valve body which is arranged in an axial portion of the power piston, a constant pressure chamber and a variable pressure chamber defined forwardly and rearwardly, respectively, of the power piston as viewed in the direction of operation thereof, a passage formed in the valve body for providing a communication between the valve mechanism and the constant pressure chamber, and an open/close valve mounted on the valve body for opening and closing the passage;

characterized in that the open/close valve comprises a valve seat formed in surrounding relationship with the passage, a valve element reciprocally movable within a casing which is mounted on the valve body, a pressure chamber defined in the casing for urging the valve element toward the valve seat, and pressure fluid supply means for supplying a pressure fluid into the pressure chamber from the outside of the shell to cause the valve element to be seated upon the valve seat, said valve mechanism including means for selectively switching said variable pressure chamber into fluid communication with said passage, and said valve seat being located between said valve element and said passage to enable the valve element to serve also as a relief valve which is urged to move away from the valve seat in response to a fluid pressure introduced into the variable pressure chamber when the valve element is seated upon the valve seat and the variable pressure chamber is communicating with said passage, and which moves away from the valve seat when a fluid pressure in excess of a given value is introduced into the variable pressure chamber.

7. A brake booster according to claim 6, including a spring means for yieldably urging said valve element away from said valve seat.

8. A brake booster according to claim 7, wherein said spring means is a coil spring interposed between said valve element and an end face of said valve body.

9. A brake booster according to claim 6 in which a plate is mounted on the end face of the valve body in surrounding relationship with the opening of the passage and in a hermetically sealed manner, the valve seat being defined on the plate.

10. A brake booster according to claim 6 in which the valve element is formed with a reduced diameter portion which projects toward the valve body, the reduced diameter portion being slidably fitted into a guide opening formed in the valve body.

11. A brake booster according to claim 6 in which the pressure fluid supply means comprises a conduit which provides a communication between the pressure chamber and a source of pressure fluid which is disposed externally of the shell, a channel switching valve disposed intermediate the conduit for selectively switching the pressure chamber to the source of pressure fluid or the atmosphere, and a controller for controlling the switching valve.

* * * * *